April 9, 1963
G. M. PFUNDT
3,084,912
LASHING AND UNLASHING DEVICE
Filed Nov. 21, 1961
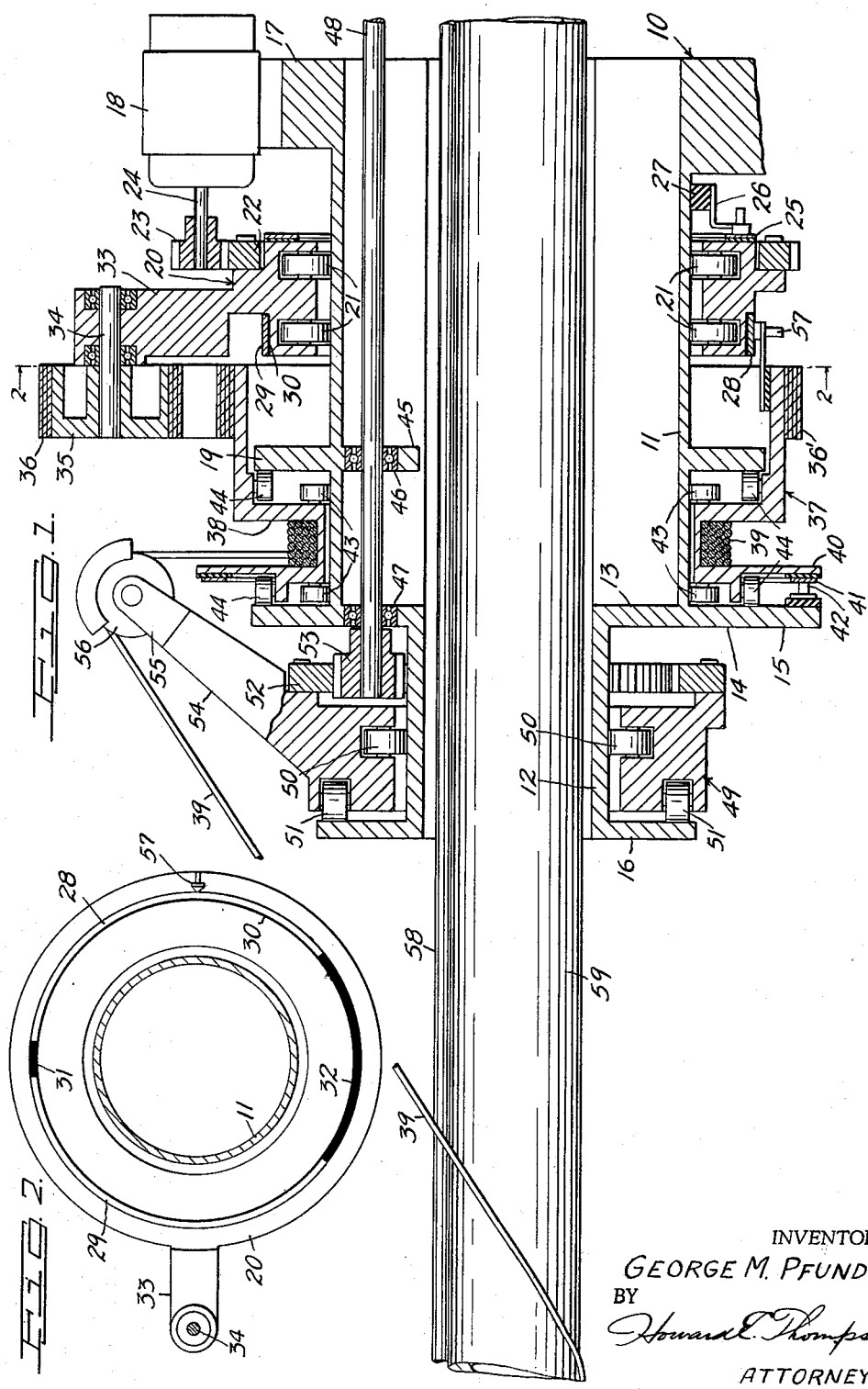
INVENTOR.
GEORGE M. PFUNDT
BY
Howard E. Thompson
ATTORNEY

United States Patent Office 3,084,912
Patented Apr. 9, 1963

3,084,912
LASHING AND UNLASHING DEVICE
George M. Pfundt, Churchville, Pa.
Filed Nov. 21, 1961, Ser. No. 153,898
17 Claims. (Cl. 254—134.3)

This invention relates to devices for lashing and unlashing two elongated members such, for example, as a hose with a supporting strand between two ships at sea in facilitating refueling of a ship without the necessity of going into port. More particularly, the invention deals with a device of the character described which, in addition to providing a support line for the hose in the initial lashing operation, also facilitates unlashing in retrieving the hose, after the refueling operation has been performed.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a device made according to my invention, schematically illustrating the various parts in a manner to simplify the showing, with parts of the construction broken away and shown in elevation; and FIG. 2 is a partial section on the line 2—2 of FIG. 1, diagrammatically illustrating the element of the device controlling lashing and unlashing operations of the device, parts of the construction, including the background showing, being omitted.

In diagrammatically illustrating one adaptation and use of my improved device, I have shown, in FIG. 1 of the drawing, a main frame 10, comprising a large diameter tubular portion 11, terminating in a smaller diameter tubular portion 12 at one end of the device, these portions being joined by an annular wall 13 continuing in a flange 14 projecting beyond the tubular portion 11, the flange having an extension 15. The tubular portion 12 has a flanged end 16. The other end of the frame 10 includes an enlarged circumferentially extended portion 17, on which a reversible motor 18 is mounted, the motor preferably having quick stop brake means. Between 14 and 17, the tubular portion 11 includes another outwardly projecting annular flange 19.

Rotatably mounted on the tubular portion 11 is a negator spring mounting drum 20 having suitable antifrictional bearing supports circumferentially arranged on the drum to engage the tubular portion 11. In the present simplified showing, two pairs of antifrictional rollers 21 are shown, it being understood that several other pairs will be circumferentially spaced about the tubular portion 11. The drum has fixed to one side thereof an annular gear 22, with which meshes a gear 23 on the shaft 24 of the motor 18. Also supported on said side of the drum 20 and suitably insulated therefrom is a contact ring 25, with which suitable contacts 26 operate, the latter having an insulated support on the main frame, as diagrammatically seen at 27.

Supported on the periphery of the other side of the drum 20 are forward and reverse contact rings 28 and 29 insulated from the drum 20 and from each other, the insulation from the drum being indicated by a solid black line 30; whereas, the insulation from each other is indicated at 31 and 32 in FIG. 2 of the drawing.

Extending radially from the periphery of the drum 20 is a bracket 33, having a free bearing support for a shaft 34, on which a spool 35 is fixed, the latter supporting a small negator spring coil 36, the characteristics of which are such as to continuously exert a rewinding tendency upon itself, thus maintaining a constant tension on the spring. Structures of this type and kind are well known in the art and, for this reason, no detail showing thereof is deemed to be necessary.

The spring 36 has its free end fixed to a line storage drum 37, on which the spring 36 is partially wound, as indicated at 36'. The drum 37 has what might be termed a spool portion 38, on which the lashing line 39 is wound, part of this winding being diagrammatically illustrated in FIG. 1 of the drawing. The spool portion 38 has, at one side, an extending annular rim 40, which forms a support for a contact ring 41 insulated from 40, as diagrammatically illustrated. Mounted on the extension 15 is a brush or contact 42 operatively engaging the ring 41.

For free movement of the drum on the main frame 10, rollers or other antifrictional devices are provided between the drum 37 and the tube 11, as diagrammatically illustrated at 43, these being spaced circumferentially of the drum. Other antifrictional devices or rollers are similarly spaced on the drum 37, as indicated at 44, which operatively engage the flanges 14 and 19 in maintaining proper position of the drum 37 on the main frame at all times.

Extending into the bore of the tubular portion 11 of the main frame in spaced relation to the wall 13 is a bracket 45 supporting a bearing 46, the wall 13 having, in alinement with the bearing 46, another bearing 47 and mounted in these bearings is a spinner member drive shaft 48 for rotating a spinner member 49 rotatably mounted on the reduced tubular portion 12 of the main frame between 13 and 16. The member 49 has circumferentially spaced bearings 50 and 51 providing free rotation of the member 49 on the tubular portion 12 and upon the flange 16.

Supported on the inner surface of the member 49 is an internal annular gear 52, with which meshes a gear 53 fixed to the shaft 48. At this time, it is well to mention that the drive for the shaft 48 is on the supply ship and is not shown, it being understood that the main frame 10 is also supported on the supply ship controlling operation of the lashing device.

The spinner member 49 has a radially extending arm 54, with a yoke-shaped end 55 supporting a grooved wheel 56, around which the lashing line 39 passes, the arm 54 extending in the direction of the storage drum 37, so as to position the wheel above the spool portion 38 of the drum, as diagrammatically illustrated in FIG. 1 of the drawing.

Supported on the inner surface of the drum 37 is a contact brush 57, the same being insulated from the drum, as diagrammatically illustrated, and this brush operates upon the contacts 28 and 29, the brush 57 being diagrammatically illustrated in FIG. 2 and shown in operative engagement with the forward contact 28.

In the use of the device, a support line 58, shown located upon the top of a fuel hose 59 in FIG. 1 of the drawing, is coupled with the ship to be serviced and extends from a winch drum on a supply ship, as does also the hose 59. The free end of the hose has a suitable probe end, with means coupling the lashing line 39 therewith so that, after the end of the hose has been suitably coupled with the ship to be serviced, the lashing device is put into operation to wind the lashing line 39 around the hose 59 and the support line 58 therefor to maintain these in closed proximity to each other at all times and, in this operation, the spinner member 49 is driven through 50, 52 approximately on the basis of one turn of the spinner member to each two feet that is payed out or delivered by the line 39 in the lashing operation or in rewinding of the line on the drum 37 in the unlashing operation, the latter being performed after the fuel has been transmitted through the hose 59 from the supply ship to the ship being serviced.

It will be understood that, in servicing ships at sea, the ships are in spaced relationship to each other a reasonably safe distance to compensate for roughness of the sea, or other waters upon which the ships may be located at the time and, by providing the support line lashed to the hose 58, the motor 18 will operate at all times to maintain tension on the lashing line 39, not only in the winding and unwinding operations, but during irregular shifting movements between the two ships caused by roughness of the sea or other waterway. In other words, it will be apparent that the motor 18 maintains a constant tension on the line 39 while, at the same time, permitting withdrawal of the line 39 from the drum 37 in the lashing operation and rewinding of the line on the drum in the unlashing operation. Suitable electric controls will be provided for the circuits between 57 and the two contacts 28 and 29 and between 25 and 26 and 41 and 42. In this connection, it will be understood that the motor 18, in driving the drum 20, maintains variable relationship between this drum and the drum 37 so that, when the negator spring is retracted, the motor is switched to extend the spring and, when the negator spring is extended, the motor is switched to retract the spring. Here it should be pointed out that the circuits through 25, 26, 41 and 42 are constant; whereas, the circuit is moved from forward and reverse drives by relationship of the brush 57 with the forward and reverse contacts 28 and 29.

In the operation of arranging for the refueling of a ship from a supply ship, and keeping in mind that ships cannot, in rough waters, come in close proximity to each other, a line will be cast from the ship to be serviced to the supply ship and the end of the hose 59 and support line or strand 58 coupled therewith, while the ends of the latter are adjacent the lashing device. Then, as the hose and support line or strand are drawn toward the ship to be serviced, the lashing operation will be performed and, after the hose has been coupled with the tank or the like of the ship to be serviced, then the ships can separate to a reasonably safe distance with respect to each other, the lashing being continued during this latter operation.

In like manner, after the termination of transmission of fuel, return of the hose and support line or strand and the unlashing operation will be performed until the ships are again in reasonably close proximity to each other and the free end of the hose can be guided to the supply ship by a line extending from the serviced ship, until the hose and support line or strand have been fully retrieved.

In the foregoing specification, I have referred to one adaptation and use of the device. It will be understood, however, that this device can be utilized as a means for spirally wrapping an element such, for example, as the lashing line 39 on elongated members moved through the device where the element is maintained under tension at all times to insure a firm engagement of the element with the elongated member or members passed through the device.

Having fully described my invention, what I claim as new and desire to secure by Letters Patent is:

1. A device of the character described comprising a main tubular frame, through which an elongated member is adapted to pass, two drums rotatably mounted on said frame intermediate end portions thereof, a spinner member rotatably mounted on the frame at one end thereof, means for rotating said spinner member at predetermined controlled speeds, one of said drums including a spool portion, upon which an element is stored, said spinner member having means spaced with respect to and alined with said spool portion for guidance of an element withdrawn by said spinner member from said spool portion in spiral wrapping of said element upon the member passed through the tubular portion of said main frame, spring means tensionally coupling the other of said drums with said first mentioned drum for constantly maintaining tension on said element, means including an electric motor supported on said main frame for driving the second named drum in governing the tensional control on said element, circuit controlling means between each of said drums and the main frame controlling part of the circuit to said motor, and other circuit controlling means between both of the drums controlling operation of said motor.

2. A device as defined in claim 1, wherein said motor has forward and reverse drives, and said last named means includes a forward drive contact portion and a reverse drive contact portion insulated from the forward drive portion.

3. A device as defined in claim 1, wherein the drive between said motor and second named drum comprises a gear on said drum meshing with a gear on the shaft of said motor.

4. A device as defined in claim 3, wherein the first named means comprises an internal gear on the spinner member, a driven shaft supported in connection with the main frame, and a gear on said shaft operatively engaging said internal gear.

5. A device as defined in claim 1, wherein said second named drum includes antifrictional means for free rotation thereof on a tubular portion of said main frame.

6. A device as defined in claim 1, wherein said spinner member includes antifrictional means for free rotation of the spinner member on a tubular portion of said main frame, said frame including, adjacent the spinner member, an extended flange portion, and other antifrictional means for free movement of the spinner member with respect to said flange portion.

7. A device as defined in claim 1, wherein the main frame includes large and small diameter tubular portions, the large diameter portion having a pair of spaced projecting annular flanges, said spool portion of the first named drum operating between said annular flanges, and means providing a plurality of antifrictional supports for the first named drum in establishing free rotation and guidance of the first named drum on the main frame.

8. A device as defined in claim 1, wherein the first named means comprises an internal gear on the spinner member, a driven shaft supported in connection with the main frame, and a gear on said shaft operatively engaging said internal gear.

9. A device as defined in claim 1, wherein the first named circuit controlling means comprises contact rings mounted on said drums, and contacts supported on the main frame operatively engaging said rings.

10. A device as defined in claim 2, wherein the forward and reverse drive contact portions are mounted on the second named drum, and a contact brush mounted on the first named drum operatively engaging the forward and reverse drive contact portions.

11. A device as defined in claim 1, wherein said elongated member passing through the main frame comprises a tube, a supporting strand for said tube movable through the main frame with said member, and said element comprising a lashing line spirally wound upon said member and supporting strand by said device in passage of the member and supporting strand through the device.

12. A device as defined in claim 11, wherein the speed of rotation of said spinner member is such as to rotate about the elongated member and supporting strand one revolution in a predetermined foot passage of the elongated member and supporting strand through the device.

13. A device as defined in claim 12, wherein the device, by virtue of reverse drive of said motor, facilitates winding and unwinding of the lashing line in both directional movements of the elongated member and support strand through the device.

14. A device as defined in claim 13, wherein said tensional means comprises a flat spring having a negator spring mounting on the second named drum and a winding and coupling on the first named drum.

15. A device for lashing and unlashing a line on a hose and support strand therefor, said device comprising a main frame adapted for mounting on a relatively fixed support, said main frame having means for guiding a hose and support strand for movement through said device, said device including means storing a supply of a lashing line, means rotatable on said main frame controlling lashing and unlashing of said line, said last named means including a radially extending arm controlling guidance of the lashing line onto said hose and support strand in the movement of the hose and support strand through said main frame, and means maintaining a constant tension on said lashing line.

16. A device as defined in claim 15, wherein said last named means includes a reverse drive electric motor actuating a member freely rotatable on the main frame, and said member controlling operation of a negator spring.

17. A device as defined in claim 16, wherein said rotatable means comprises a spinner member, said spinner member including a drive independent of said motor, and the drive of said spinner member being such as to rotate about the hose and support strand substantially one revolution in approximately two foot of travel of the hose and support strand through the device in both directions.

References Cited in the file of this patent
UNITED STATES PATENTS

| | | |
|---|---|---|
| 1,060,785 | Pahl | May 6, 1913 |
| 1,685,927 | Miller | Oct. 2, 1928 |
| 2,153,072 | Bookout et al. | Apr. 4, 1939 |
| 2,479,635 | Neale | Aug. 23, 1949 |